United States Patent
Costanzo et al.

(10) Patent No.: US 7,073,651 B2
(45) Date of Patent: Jul. 11, 2006

(54) MODULAR MAT GRAVITY-ADVANCE ROLLER CONVEYOR

(75) Inventors: Mark Costanzo, River Ridge, LA (US); David W. Riddick, Westwego, LA (US)

(73) Assignee: Laitram, L.L.C., Harahen, LA (US)

( * ) Notice: Subject to any disclaimer, the term of this patent is extended or adjusted under 35 U.S.C. 154(b) by 276 days.

(21) Appl. No.: 10/604,558

(22) Filed: Jul. 30, 2003

(65) Prior Publication Data

US 2005/0023105 A1 Feb. 3, 2005

(51) Int. Cl.
*B65G 13/00* (2006.01)

(52) U.S. Cl. .............. 193/35 MD; 193/35 C; 193/35 TE; 198/359

(58) Field of Classification Search .............. 193/35 C, 193/35 TE, 35 MD; 198/359
See application file for complete search history.

(56) References Cited

U.S. PATENT DOCUMENTS

| | | | |
|---|---|---|---|
| 3,444,973 A | 5/1969 | Nygren | |
| 3,550,756 A | 12/1970 | Kornylak | 198/183 |
| 3,679,043 A * | 7/1972 | Becker | 198/349 |
| 3,797,634 A * | 3/1974 | Field | 198/536 |
| 4,143,756 A | 3/1979 | Chorlton | 198/457 |
| 4,909,380 A | 3/1990 | Hodlewsky | |
| 5,074,405 A * | 12/1991 | Magolske et al. | 198/786 |
| 5,333,722 A * | 8/1994 | Ouellette | 198/436 |
| 5,551,543 A | 9/1996 | Mattingly et al. | 198/370.09 |
| 5,769,204 A | 6/1998 | Okada et al. | 198/443 |
| 5,890,582 A * | 4/1999 | McKinnon et al. | 198/781.04 |
| 6,073,747 A | 6/2000 | Takino et al. | 198/370.09 |
| 6,076,653 A | 6/2000 | Bonnet | 198/370.09 |
| 6,148,990 A | 11/2000 | Lapeyre et al. | 198/779 |
| 6,209,714 B1 * | 4/2001 | Lapeyre et al. | 198/779 |
| 6,367,616 B1 * | 4/2002 | Lapeyre et al. | 198/779 |
| 6,494,312 B1 * | 12/2002 | Costanzo | 198/779 |
| 6,568,522 B1 * | 5/2003 | Boelaars | 198/347.2 |
| 6,571,937 B1 * | 6/2003 | Costanzo et al. | 198/779 |
| 6,622,846 B1 * | 9/2003 | Dean | 198/370.09 |
| 6,675,946 B1 * | 1/2004 | Lutz | 193/35 TE |
| 6,758,323 B1 * | 7/2004 | Costanzo | 198/457.02 |
| 2003/0221932 A1 | 12/2003 | Costanzo | 193/35 MD |

FOREIGN PATENT DOCUMENTS

| | | |
|---|---|---|
| AU | 416 328 B | 8/1971 |
| DE | 10 70 097 B | 11/1959 |
| NL | 1 010 530 C | 5/2000 |

OTHER PUBLICATIONS

European Patent Office, Partial European Search Report of European Patent Application No. 04254342.1, Oct. 19, 2004.

* cited by examiner

*Primary Examiner*—Douglass Hess
(74) *Attorney, Agent, or Firm*—James T. Cronvich

(57) ABSTRACT

A modular gravity-advance roller conveyor for conveying articles down an inclined path. The conveyor comprises an easy-to-configure modular conveyor mat supported in a conveyor frame with an inclined base. The conveyor mat is constructed of a series of rows of roller-top modules with rollers that extend above the top surface of the mat. Connecting elements along the ends of each row are connected to the connecting elements of adjacent rows to form the mat. The rollers on a roller-top module rotate about an axis of rotation. Modules with rollers that rotate about a given axis of rotation can be combined with modules with rollers that rotate about a different axis of rotation in a variety of patterns to meet common or special conveying requirements.

26 Claims, 5 Drawing Sheets

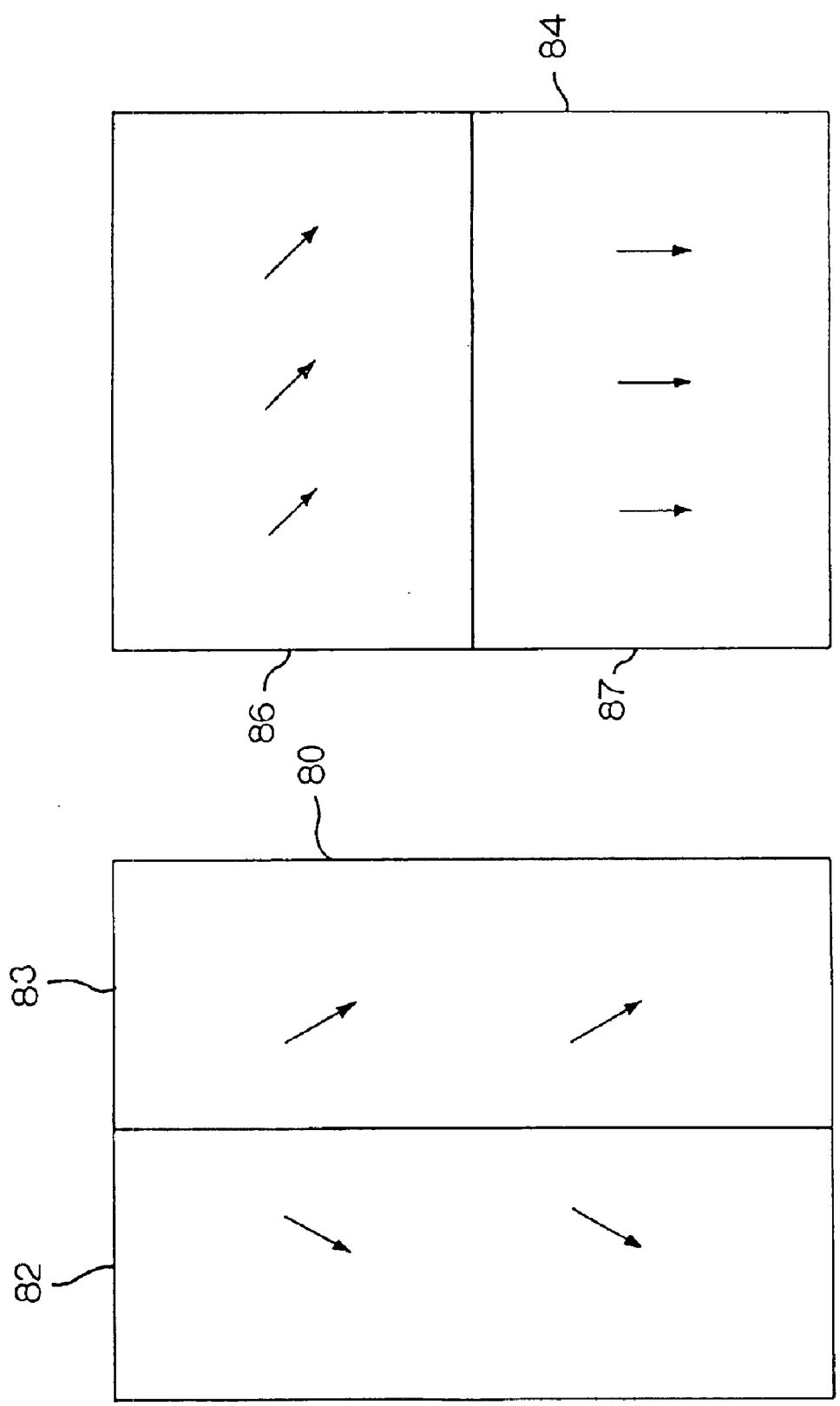

MODULAR MAT GRAVITY-ADVANCE ROLLER CONVEYOR

BACKGROUND OF INVENTION

The invention relates generally to gravity-advance conveyors and, more particularly, to inclined rollerways made of modular roller sections for conveying articles down an inclined path.

Gravity-advance roller conveyors, in which a roller conveyor bed is arranged on an incline, are often used to convey pallets or boxes from high levels to lower levels in warehouses. Because gravity-advance conveyors do not require a drive system, they are less complex than powered-roller conveyors. But, like all conventional metal roller conveyors, powered or not, gravity-advance roller conveyors are noisy when articles are advancing along them. Furthermore, the conveyor frames include mounting holes positioned along the sides to support the ends of the rollers or shafts on which the rollers rotate. Because of the fixed position of the mounting holes in a given conveyor frame, it is difficult to adapt the conveyor frame to accommodate, for example, a change in the orientation of the rollers without extensive rework.

Thus, there is a need for a conveyor that avoids some of the shortcomings of conventional gravity-advance roller conveyors.

SUMMARY OF INVENTION

This need and other needs are satisfied by a modular gravity-advance roller conveyor embodying features of the invention. One version of conveyor comprises a mat that is constructed of a plurality of rows of modules. Each row extends longitudinally from a first end to a second end, transversely from a left side to a right side, and in thickness from a top surface to a bottom surface. Each row further includes connecting elements along each end linked with the connecting elements of consecutive rows to form the mat, which extends from an entrance end to an exit end. At least some of the rows have rollers extending above the top surface of the row. A conveyor frame includes an inclined base that supports the mat. The elevation of the entrance end of the mat is higher than the elevation of the exit end. In this way, the weight of an article introduced onto the mat causes the rollers beneath the article to rotate. The rotating rollers move the article down the inclined mat toward the exit end.

In another version of the invention, a modular gravity-advance roller conveyor comprises a stationary mat, which includes a plurality of modules linked together in rows. At least some of the modules have rollers extending above the top surface of the mat. A conveyor frame includes an inclined base supporting the mat between a higher end and a lower end. The weight of articles introduced onto the mat causes the rollers in contact with the articles to rotate and move the articles toward the lower end of the mat.

In another aspect of the invention, a modular gravity roller conveyor comprises a conveyor frame with an inclined base. A length of modular plastic roller-top conveyor belt is supported stationarily on the inclined base to form a modular gravity roller conveyor.

In yet another aspect of the invention, a method for constructing a gravity conveyor comprises providing a conveyor frame with an inclined base and supporting a length of modular roller-top conveyor belt stationarily on the inclined base of the conveyor frame.

BRIEF DESCRIPTION OF DRAWINGS

The features, aspects, and advantages of the invention are better understood by reference to the following description, appended claims, and accompanying drawings, in which:

FIGS. 5, 6, and 7 are schematic representations of plan views of other roller arrangements for gravity conveyors embodying features of the invention.

DETAILED DESCRIPTION

Figure 1:
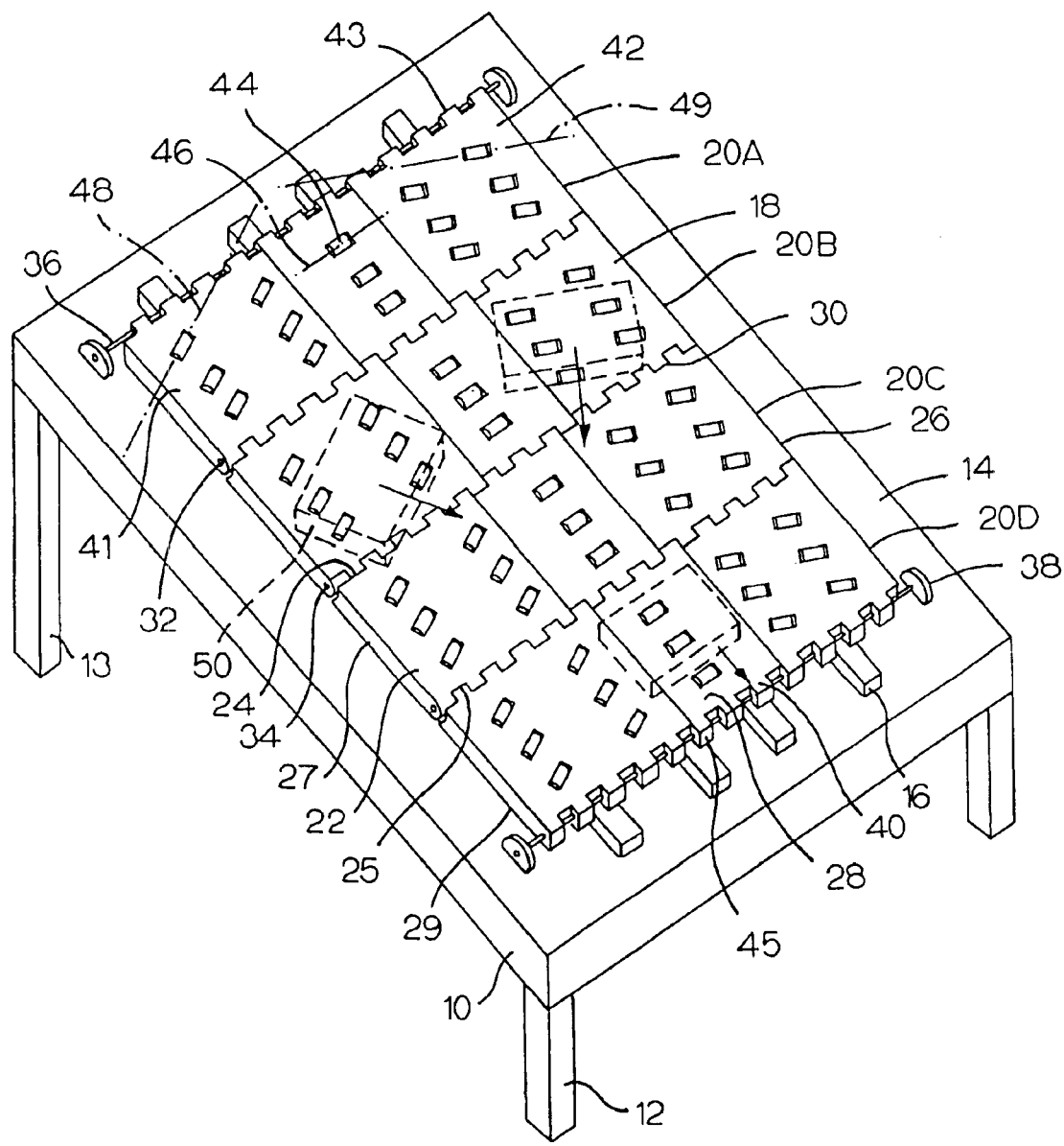
FIG. 1 is an isometric view of a gravity roller conveyor embodying features of the invention.

A conveyor embodying features of the invention is shown in FIG. 1. The conveyor includes a frame 10 having front legs 12 and longer rear legs 13 supporting a base 14 inclined downwardly from rear to front in FIG. 1 to form a gravity-advance conveyor frame. Wearstrips 16 in the form of transversely spaced longitudinal strips support a conveyor mat 18. The mat is constructed of a series of rows 20A–D of modules 22. Each row extends longitudinally from a first end 24 to a second end 25, transversely from a right side 26 to a left side 27, and in thickness from a top surface 28 to a bottom surface 29. Connecting elements 30 that are spaced apart along the ends of each row interleave with the connecting elements of adjacent rows. A connecting pin 32 extending through a passageway formed by aligned transverse apertures 34 through the connecting elements connects adjacent rows together. Pins 36 through the apertures of the uppermost and lowermost connecting elements of the mat are retained at their ends in retainers 38 on the frame to secure the mat in place. The mat can be easily constructed from a length of modular plastic conveyor belt, such as the roller-top versions of the Series 400 belt manufactured and sold by Intralox, Inc., of Harahan, La., USA. Although a single mat is shown, the conveyor could be constructed of a number of abutting or closely spaced individual mats, and the term "mat" refers to both constructions.

The mat shown in FIG. 1 is constructed of roller-top modules 40, 41, 42. The center modules 40 have rollers 44 that are arranged to rotate about transverse axes 46. The rollers in the left-side modules 41 rotate about first axes 48 oblique to the transverse direction. The rollers in the right-side modules 42 rotate about second axes 49 oblique to the transverse direction and mirroring the first axes about the centerline of the mat. At least a portion of each roller extends above the top surface of the mat to engage the undersides of articles 50 introduced onto the conveyor. Because of the incline, the weight of the articles on the rollers causes the rollers in contact with the articles to rotate and direct the articles in a direction generally perpendicular to the roller axes. An outer portion of each roller could, but does not have to, extend beyond the bottom surface of the mat. If the rollers do extend beyond the bottom surface of the mat, they are preferably arranged in transversely spaced longitudinal lanes so that the mat can be positioned on the supporting wearstrips with the strips between the roller lanes to avoid interfering with the rotation of the rollers. If the rollers do not extend outward of the bottom surface, other wearstrip patterns can be used.

In the example conveyor of FIG. 1, the angled roller arrangement on the left side urges articles entering the upper entrance end 43 of the mat toward the right, and the oppositely angled roller arrangement on the right side urges articles towards the left. As articles reach the center of the mat, the central rollers that rotate about transverse axes direct the articles straight down the conveyor and off the lower exit end 45 of the mat. Thus, the conveyor of FIG. 1 acts as a gravity-advance centering roller conveyor by directing articles toward the center of the conveyor.

Figure 2A:
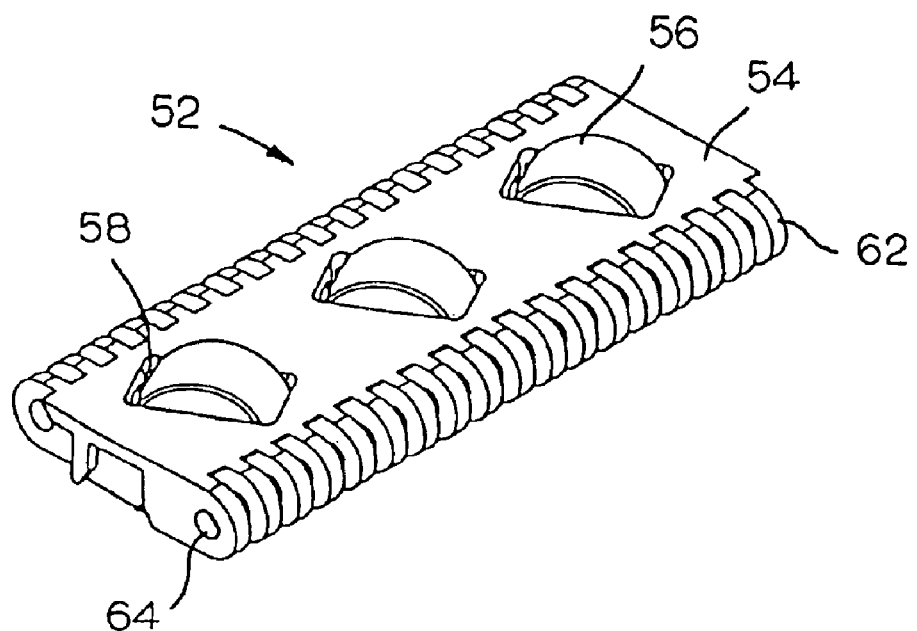
FIGS. 2A and 2B are top and bottom isometric views of a cylindrical roller-top module usable in a conveyor as in FIG. 1.
Figure 2B:
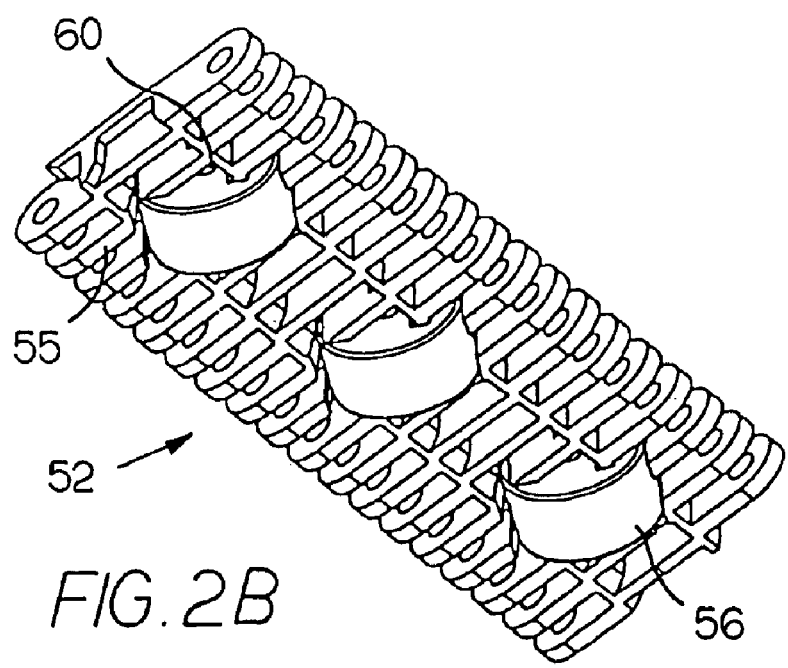

A typical angled roller-top belt module that could be used as a left-side module in the conveyor of FIG. 1 is shown in FIGS. 2A and 2B. The module 52 has a flat top surface 54 and an opposite bottom surface 55. Cylindrical rollers 56 are rotatably mounted in cavities 58 that open onto the top surface and the bottom surface. The rollers rotate on axles 60 retained in the interior of the module. Connecting elements 62 along each end of the module include aligned apertures 64 for receiving connecting pins to interconnect modules together. A module usable in the center or in right side of the conveyor of FIG. 1 would be similarly formed, but with the orientation of the rollers appropriately arranged. The module bodies are preferably formed by injection molding out of thermoplastic materials such as polyethylene, polypropylene, acetal, and composite resins, for example.

Figure 3:
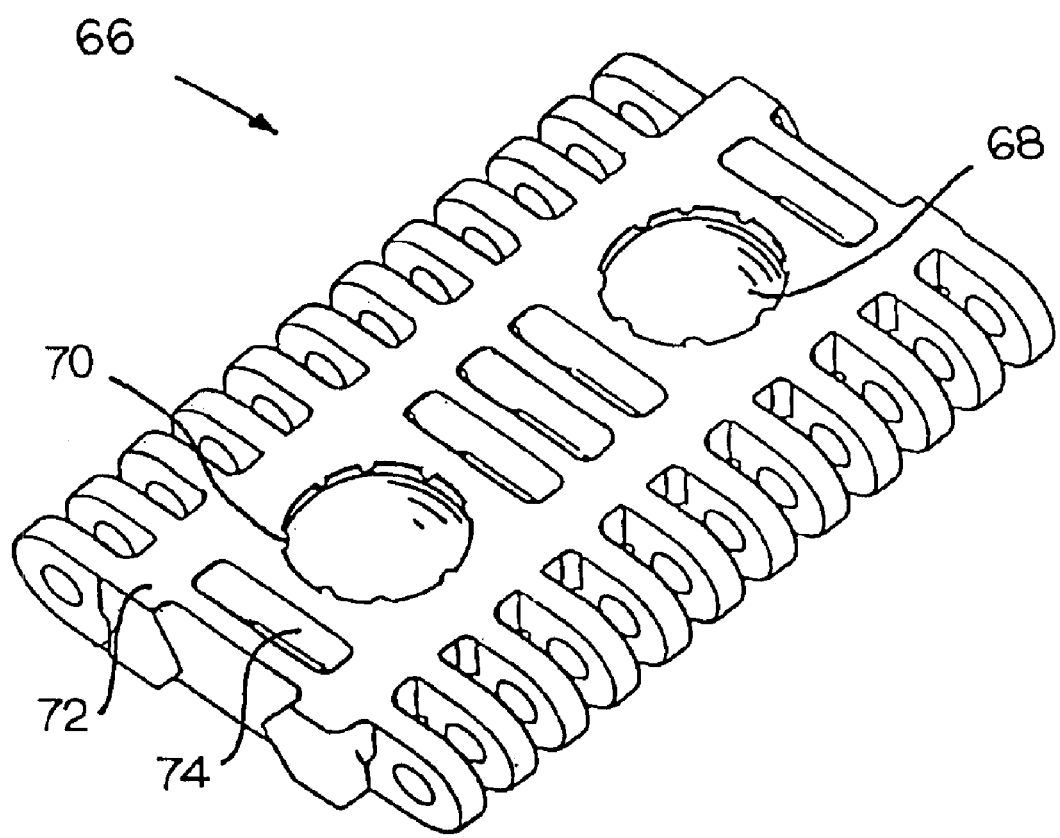
FIG. 3 is an isometric view of a ball-top module useable in a conveyor as in FIG. 1.

Instead of using modules with cylindrical rollers that rotate about fixed axes, the conveyor of FIG. 1 could use modules 66 with universally rotatable ball rollers 68, as shown in FIG. 3. The module is similar to that of FIG. 2, but includes a round cavity 70 opening onto the top surface 72. The roller ball is confined in the round cavity with a salient portion of the ball extending above the top surface of the module. The module is further shown with openings 74 through the module body for drainage, airflow, or weight reduction. These ball-top modules are usable, for example, as the central modules in FIG. 1.

Figure 4:
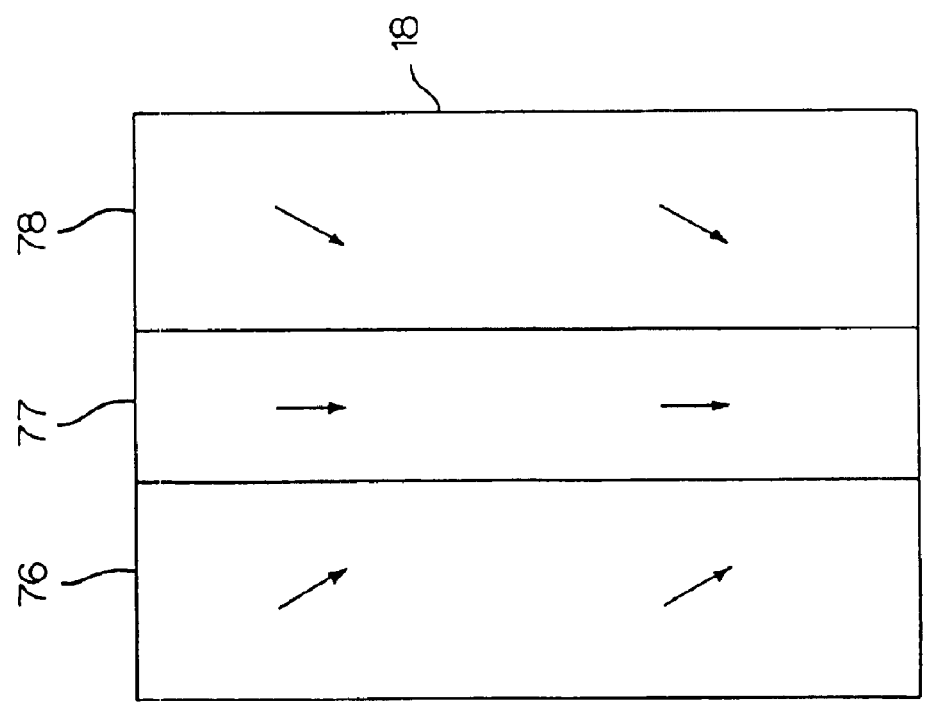
FIG. 4 is a schematic representation of a plan view of the gravity roller conveyor of FIG. 1.

The spherical and cylindrical rollers described in detail with respect to FIGS. 2 and 3 are just two examples of the types of rollers that can be used in a conveyor as in FIG. 1. Because of the modularity of modular plastic conveyor belts, it is easy to reconfigure a mat constructed of plastic modules to accommodate changing conveyor requirements. The centering conveyor of FIG. 1 is represented functionally by FIG. 4, which is a plan view of the conveyor mat. The arrows indicate the direction in which articles move as they make their way down the conveyor. The arrows are directed generally perpendicular to the axes of rotation of the rollers in that portion of the conveyor mat. Consequently, the schematic representation of FIG. 4 corresponds to the physical arrangement of FIG. 1. The conveyor mat 18 in FIG. 4 is divided transversely into three longitudinal lanes 76, 77, 78. The rollers in the left lane 76 and the right lane 78 are arranged to direct articles toward the center of the mat. The rollers in the center lane 77 direct articles straight down the conveyor mat. Thus, FIG. 4 represents a centering conveyor.

Figure 5:
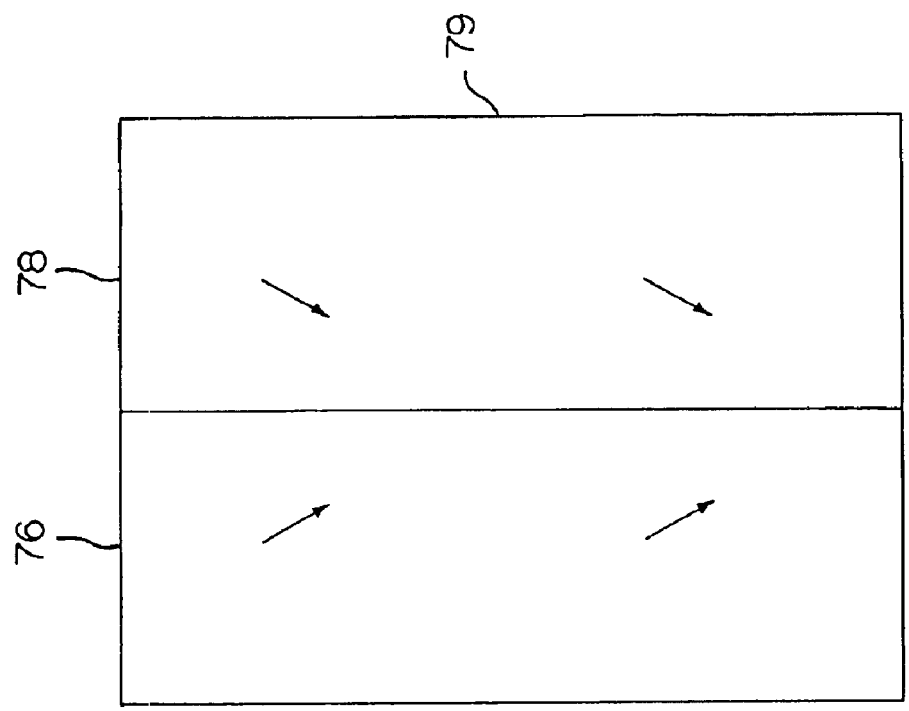

FIG. 5 represents another centering conveyor made with a modular mat 79. In this example, the conveyor mat uses right- and left-side angled roller-top modules arranged in lanes 76, 78 similar to those represented in FIG. 4. But, unlike the mat represented by FIG. 4, this centering conveyor mat does not include a central lane of rollers directing articles straight down the conveyor mat. Instead, articles directed toward the center are allowed to wander slightly back and forth about the centerline of the mat as they advance down the conveyor.

Another conveyor that can easily be constructed of modular components is represented in FIG. 6. In this example, the conveyor can serve to align articles along the outside edges of the conveyor (if a side rail or guard is in place) or to transfer articles off the side edges (if no obstruction is in place at the side). The conveyor includes a mat 80 divided transversely into two longitudinal lanes 82, 83. The rollers in the left lane 82 are arranged obliquely to direct articles toward the left side of the conveyor. The rollers in the right lane 83 are arranged to direct articles toward the right side of the conveyor.

Yet another conveyor that can be constructed out of roller-top belt modules is represented by FIG. 7. This conveyor includes a mat 84 divided longitudinally into two transverse portions 86, 87. The rollers in the upper portion 86 are oriented to direct articles toward the right side of the conveyor mat. The rollers in the lower portion 87 are arranged to direct articles straight down the conveyor. In this way, the conveyor represented by FIG. 7 moves articles toward the right side before advancing them off the lower exit end.

As these few examples suggest, a modular roller-top conveyor mat can be easily reconfigured and placed in a gravity-advance roller conveyor frame to accommodate a wide variety of conveying requirements. The modularity allows readily available modules with rollers capable of rotating about a range of axes to be connected together in a pattern, even with non-roller-top modules, to form a custom conveyor mat. It should further be clear that, although the conveyor mats described in detail were laid out in the conveyor frame with connecting pins transverse to the gradient of the incline, the conveyor mats could be laid out on an inclined conveyor frame with connecting pins along or oblique to the gradient. Because it is impossible to describe all the possible patterns and arrangements, the scope of the invention is not meant to be limited to the specific versions described in detail.

What is claimed is:

1. A modular gravity-advance roller conveyor for conveying articles down an inclined path, the conveyor comprising:
   a mat including:
      a plurality of rows of one or more modules,
         each row extending longitudinally from a first end to a second end, transversely in a transverse direction from a left side to a right side, and in thickness from a top surface to a bottom surface,
         each row including linked connecting elements along the first end and the second end connecting consecutive rows together end to end to form the mat extending longitudinally from an entrance end to an exit end,
         at least some of the rows including rollers extending above the top surface of the row;
         wherein at least some of the rollers are arranged to rotate about oblique axes wherein all of the rollers are on the same conveying plane;
   a conveyor frame including an inclined base supporting the mat with the entrance end of the mat positioned at a higher elevation on the inclined base than the exit end of the mat;
   whereby the weight of articles introduced onto the mat causes the rollers in contact with the articles to rotate and move the articles down the mat.

2. A conveyor as in claim 1 further including connecting pins extending transversely through the connecting elements to link the connecting elements of consecutive rows together.

3. A conveyor as in claim 1 wherein at least some of the rollers are arranged to rotate about transverse axes.

4. A conveyor as in claim 1 wherein at least some of the rollers are universally rotatable roller balls.

5. A conveyor as in claim 1 wherein at least some of the rollers are cylindrical rollers rotating on axles.

6. A conveyor as in claim 1 wherein the rollers include first rollers arranged to rotate about first axes parallel to a first direction and second rollers arranged to rotate about second axes parallel to a second direction and wherein the mat is divided transversely into first and second longitudinal lanes wherein the first longitudinal lane includes only first rollers and the second longitudinal lane includes only second rollers.

7. A conveyor as in claim 6 wherein the first direction is the transverse direction and the second direction is oblique to the transverse direction.

8. A conveyor as in claim 6 wherein the first direction and the second direction are oblique and are mirror images of each other about the longitudinal centerline of the mat.

9. A conveyor as in claim 1 wherein the mat is divided transversely into a right-side lane, a center lane, and a left-side lane and wherein rollers in the right-side lane are arranged to rotate about axes directing articles toward the center lane and wherein rollers in the left-side lane are arranged to rotate about axes directing articles toward the center lane.

10. A conveyor as in claim 9 wherein rollers in the center lane are arranged to direct articles longitudinally down the center lane.

11. A conveyor as in claim 1 wherein the mat is divided longitudinally into an upper portion and a lower portion and wherein rollers in the upper portion are arranged to rotate about axes parallel to a first direction and wherein rollers in the lower portion are arranged to rotate about axes parallel to a second direction.

12. A conveyor as in claim 11 wherein the second direction is the transverse direction and the first direction is oblique to the transverse direction.

13. A conveyor as in claim 1 wherein the rollers in the mat are arranged in longitudinal lanes and extend beyond the bottom surface of the mat and wherein the inclined base includes a plurality of transversely spaced longitudinal support strips positioned between the longitudinal lanes of rollers on the mat.

14. A modular gravity roller conveyor for conveying articles down an inclined path, the conveyor comprising:
a conveyor frame including an inclined base;
a length of modular plastic roller-top conveyor belt supported stationarily on the inclined base and extending longitudinally from an upper end to a lower end and transversely in a transverse direction from a left side to a right side and including rollers, at least some of which are arranged to rotate about oblique axes wherein all of the rollers are on the same conveying plane.

15. A conveyor as in claim 14 wherein the modular plastic roller-top conveyor belt includes first rollers arranged to rotate about first axes parallel to a first direction and second rollers arranged to rotate about second axes parallel to a second direction and wherein the belt is divided transversely into first and second longitudinal lanes wherein the first longitudinal lane includes only first rollers and the second longitudinal lane includes only second rollers.

16. A conveyor as in claim 15 wherein the first direction is the transverse direction and the second direction is oblique to the transverse direction.

17. A conveyor as in claim 14 wherein the modular plastic roller-top conveyor belt is divided transversely into a right-side lane, a center lane, and a left-side lane and wherein rollers in the right-side lane are arranged to rotate about axes directing articles toward the center lane and wherein rollers in the left-side lane are arranged to rotate about axes directing articles toward the center lane.

18. A conveyor as in claim 17 wherein rollers in the center lane are arranged to direct articles longitudinally down the center lane.

19. A conveyor as in claim 14 wherein the modular plastic roller-top conveyor belt is divided longitudinally into an upper portion and a lower portion and wherein rollers in the upper portion are arranged to rotate about axes parallel to a first direction and wherein rollers in the lower portion are arranged to rotate about axes parallel to a second direction.

20. A conveyor as in claim 19 wherein the second direction is the transverse direction and the first direction is oblique to the transverse direction.

21. A method for constructing a gravity conveyor, the method comprising:
providing a conveyor frame with an inclined base;
supporting a length of modular roller-top conveyor belt stationarily on the inclined base of the conveyor frame;
wherein the modular roller-top belt includes rollers, at least some of which are arranged to rotate about oblique axes wherein all of the rollers are on the same conveying plane.

22. A modular gravity-advance roller conveyor for conveying articles down an inclined path, the conveyor comprising:
a stationary mat including:
a plurality of modules linked together in rows to form the mat,
at least some of the modules including rollers extending above the top surface of the mat wherein at least some of the rollers are arranged to rotate about oblique axes wherein all of the rollers are on the same conveying plane;
a conveyor frame including an inclined base supporting the mat between a higher end and a lower end;
whereby the weight of articles introduced onto the mat causes the rollers in contact with the articles to rotate and move the articles toward the lower end of the mat.

23. A conveyor as in claim 22 wherein at least some of the rollers are universally rotatable roller balls.

24. A conveyor as in claim 22 wherein at least some of the rollers are cylindrical rollers rotating on axles.

25. A conveyor as in claim 22 wherein the mat is divided into a right-side lane, a center lane, and a left-side lane and wherein rollers in the right-side lane are arranged to rotate about axes directing articles toward the center lane and wherein rollers in the left-side lane are arranged to rotate about axes directing articles toward the center lane as the articles move toward the lower end of the mat.

26. A conveyor as in claim 25 wherein rollers in the center lane are arranged to direct articles down the center lane as the articles move toward the lower end of the mat.

* * * * *